United States Patent [19]

Neefe

[11] Patent Number: 4,614,624

[45] Date of Patent: Sep. 30, 1986

[54] METHOD OF MOLDING BIFOCAL LENSES

[76] Inventor: Charles W. Neefe, 811 Scurry St.-Box 429, Big Spring, Tex. 79720

[21] Appl. No.: 734,129

[22] Filed: May 14, 1985

Related U.S. Application Data

[63] Continuation-in-part of Ser. No. 710,983, Mar. 12, 1985, abandoned, which is a continuation-in-part of Ser. No. 503,756, Jun. 13, 1983, abandoned.

[51] Int. Cl.[4] .............................................. B29D 11/00
[52] U.S. Cl. ...................................... 264/2.5; 264/2.7; 425/808
[58] Field of Search ......................... 264/2.5, 1.8, 2.7; 425/808

[56] References Cited

U.S. PATENT DOCUMENTS

| | | | |
|---|---|---|---|
| 2,936,674 | 5/1960 | Beasley | 65/37 |
| 3,460,928 | 8/1969 | Cosko | 425/808 |
| 3,806,079 | 4/1974 | Beattie | 425/808 |
| 4,163,655 | 8/1979 | Campbell | 425/808 |
| 4,239,712 | 12/1980 | Neefe | 264/2.2 |
| 4,279,401 | 7/1981 | Ramirez et al. | 425/808 |

OTHER PUBLICATIONS

"A No-Jump Bifocal Contact Lens", Mandell, Optometric Weekly, vol. 58, No. 22, pp. 19-21, Jun. 1, 1967.

Primary Examiner—James Lowe

[57] ABSTRACT

A method of simultaneously casting the convex and concave surfaces on a one piece crescent shaped segment bifocal lens. A metal mold is made by lathe cutting and polishing a first convex short radius optical surface in the central area of a metal disk shaped blank. The second longer convex radius optical surface having from 0.25 to 3.0 prism-diopters and intersecting the first curve at the center of the blank is cut and polished on the metal blank.

A resinous bifocal concave mold is made by replication from the metal convex mold. A second convex resinous optical mold is aligned on the concave bifocal resinous mold and the space between filled with the liquid lens monomer. The monomer is polymerized to form a solid polymer bifocal lens.

9 Claims, 7 Drawing Figures

4,614,624

METHOD OF MOLDING BIFOCAL LENSES

This is a continuation-in-part of application Ser. No. 710,983 filed 03/12/85, now abandoned, entitled; METHOD OF MAKING BIFOCAL CONTACT LENSES which is a continuation-in-part of application Ser. No. 503,756 filed 06/13/83 entitled; METHOD OF MAKING BIFOCAL CONTACT LENSES and now abandoned.

BACKGROUND OF THE INVENTION

The use of plastic material for making optical lenses has increased rapidly for the past ten years. This is due to the availability of better plastic materials and the physical advantages of the plastic resins for specific applications such as contact lenses. The technology for the production of high quality bifocal contact lenses has not kept pace with the material supply industry. It is important to advance both areas if the full potential is to be realized.

The current bifocal lens molds are fabricated from metal or glass, each mold is individually ground and polished to the required specifications. To achieve accurate reproduction of the bifocal molds is most difficult and expensive. This new process makes possible exact reproductions by replication and has many other distinct advantages which will become apparent from the following disclosure.

The object of the invention is to provide a process for making inexpensive bifocal contact lenses which may be made to identical specifications.

PRIOR ART

U.S. Pat. Nos. 4,239,712 Dec. 15, 1980 and 4,202,848 May 13, 1980 disclose lenses having a crescent shaped reading segment cut and polished on the front surface. In these patents, methods are disclosed wherein the reading segment is cut into the distance segment. A protective layer on the distant segment is required during the polishing operation. The demarcation line at the upper edge of the segment is not well defined and has a width of 0.10 m/m to 0.25 m/m due to eroding of the protective cover. The herein described invention overcomes the limitations by using bifocal molds made by replication.

DESCRIPTION OF THE PREFERRED EMBODIMENT

The Cresent Segment Bifocal Lens is Made as Follows

Figure 1:
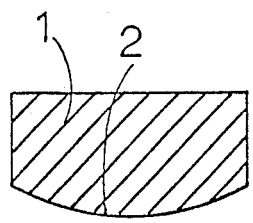
FIG. 1 shows the metal mold blank in section.
Figure 2:
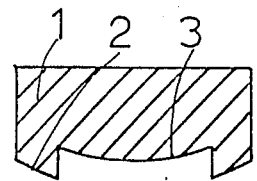
FIG. 2 shows the metal mold blank with the bifocal segment in section.

A disk shaped mold blank 1 FIG. 1 is selected from a metal capable of being polished to an optical surface. Examples are 303 stainless steel, brass, spectrum metal, 420 stainless steel. A rough curve 2 FIG. 1 is cut on the surface of the blank. The shorter radius near focusing radius 3 FIG. 2 is cut and polished in the center of the mold blank. The size of the central depression 3 FIG. 2 is equal to the width of the finished segment. Polishing is accomplished using fine emery particles followed by lapping with metallic oxides. Examples of the useful metallic oxides are oxides of iron, tin, aluminum and the rare earth cerium.

Figure 3:
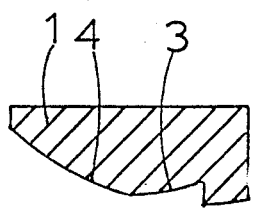
FIG. 3 shows the finished metal mold in section.

A second longer optical radius 4 FIG. 3 is cut. The second longer radius is cut by rotating the mold blank off center in an eccentric manner and allowing the second longer radius to intersect the first shorter radius surface at the center of the mold blank and at the center of the shorter radius surface. The eccentric rotation provides prism in the finished lens in the amounts of from 0.25 to 3.0 prism diopters. A prism diopter is 1 centimeter displacement of the image at a distance of one meter. Prism is the result of displacing the center of curvature from the geometric center of the lens. The prism may be present on the longer radius surface or on the shorter radius surface only. The bifocal shape and effect may be accomplished by dividing the prism between the short and longer radius surfaces. The second longer radius surface is polished as was the first surface.

A resin mold material is heated and softened and molded against the two optical surfaces of the metal convex bifocal mold. Compression or injection molding are used to produce the concave bifocal resin mold 6 FIG. 4 which is a negative image of the metal convex bifocal mold 1 FIG. 4. Examples of useful resins for making the negative replica are: nylon, polypropylene, polyvinyl chloride and polyethylene.

Figure 4:
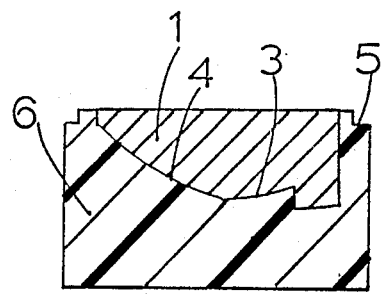
FIG. 4 shows the metal mold and the resin replication mold in section.
Figure 5:
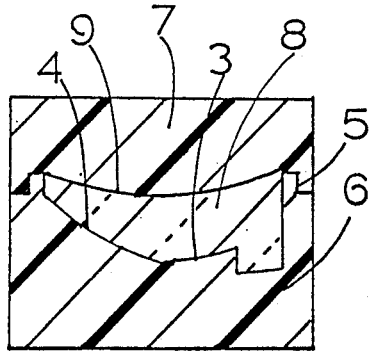
FIG. 5 shows the concave and convex resin mold with the lens monomer in place in section.

The metal bifocal mold 1 FIG. 4 provides the two convex optical surfaces 4 and 3 FIG. 4 against which the concave surface 4 and 5 FIG. 5 are molded. An alignment step 5 FIGS. 4 and 5 is provided to insure proper alignment between the convex resin mold 7 FIG. 5 and the concave bifocal resin mold 6 FIG. 5. The space between the two molds is filled with the selected lens monomer 8 FIG. 5.

Figure 6:
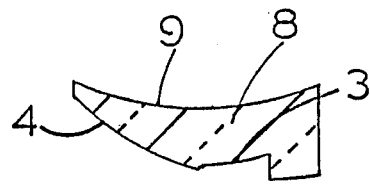
FIG. 6 shows the polymerized lens removed from the mold in section.

Examples of the useful lens monomers are methylmethacrylate, hydroxyethylmethacrylate, silicone/acrylate copolymers, fluorocarbons and polyvinyl alcohol. A suitable catalyst is added and the monomer is allowed to polymerize to form a solid transparent lens. Examples of useful catalysts are benzoyl peroxide, Vazo 33, Vazo 64, Darocur, 2,2'-Azobis[2 methyl-propylonitrile]. The mold is opened and the solid lens 8 FIG. 6 is removed. The finished lens has a concave surface 9 FIG. 6 and two curves on the convex surface 3 and 4 FIG. 6.

Figure 7:
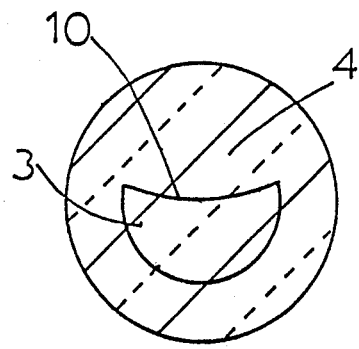
FIG. 7 shows the finished crescent segment bifocal lens from the front.

The shorter radius segment shape will be crescent. The longer radius 4 FIG. 7 and the shorter radius 3 FIG. 7 intersect to form the crescent curve 10 FIG. 7 which is the demarcation line between the two convex radii. The lens has been made using a metal convex positive pattern to make a negative concave resin mold in which the lens was cast. It is possible to make any number of identical concave lens molds from the metal convex master mold.

It is understood that the prism may be reversed and the distant lens power made without prism and the reading segment cut with prism or rotational offset or the combination of prism in both distant or near segments may be employed. Stabilization is achieved by the use of prism ballast, truncation inferiorly, thinning of the upper edge, thinning of both upper and lower edges, cutting vertical grooves near the upper edge on the convex surface of the lens. These procedures function due to the fact that the upper lid moves basically vertically during the blink and the lower lid moves basically horizontally during the blink. Truncation is usually employed to aid in stabilization of the lens and provides positive translation between the distant and near segments. Lenses are well tolerated in the eye as the thick edge remains at the bottom and the lower lid moves horizontal on the blink cycle.

Thermosetting and crosslinked hard materials may be used to produce lenses which are very dimensionally stable and could not be made by injection or compression molding. The process is also suitable for the production of soft contact lenses made from Hydroxyethyl Methacrylate which cannot be made by compression or injection molding techniques.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of simultaneously casting from a liquid lens monomer the concave and convex surfaces of a one piece bifocal lens having a crescent shaped shorter radius segment by the steps of, providing a metal mold blank, cutting and polishing a first shorter radius optical surface in the central area of the metal mold blank, the first central circular shaped optical surface has a diameter equal to the width of the crescent shaped shorter radius lens segment, cutting and polishing a second longer radius optical surface on the metal mold having its center of curvature displaced from the shorter radius center of curvature to provide from 0.25 prism diopters to 3.0 prism diopters of refraction in the bifocal lens, the longer radius convex optical mold surface intersects the shorter radius convex mold optical surface to provide a crescent shaped shorter radius convex bifocal optical mold surface, a concave resinous negative image of the bifocal metal mold is made by applying a heated and softened resin mold material against the metal convex bifocal mold, a convex resinous optical mold is aligned with the bifocal concave resinous optical mold and the space between the concave bifocal resinous mold and the convex resinous mold is filled with a selected liquid lens monomer capable of being polymerized, the selected liquid lens monomer is allowed to polymerize between the convex resinous mold surface and the concave bifocal resinous mold surface forming a solid bifocal lens having a crescent shape shorter radius segment, the solid bifocal lens is removed from the resinous molds.

2. A method as in claim 1 wherein the prism is present only in the longer radius lens segment.

3. A method as in claim 1 wherein the prism is present only in the shorter radius crescent shaped segment.

4. A method as in claim 1 wherein the prism is divided between the two bifocal segments.

5. A method as in claim 1 wherein the lens is truncated inferiorly.

6. A method as in claim 1 wherein the upper lens edge is thinned.

7. A method as in claim 1 wherein the lower lens edge is thinned.

8. A method as in claim 1 wherein vertical grooves are cut near the upper edge on the convex surface of the lens.

9. A method as in claim 1 wherein eccentric rotation is used to displace the center of curvature from the geometric center to provide the prism.

* * * * *